(12) United States Patent
Davis

(10) Patent No.: US 10,544,386 B2
(45) Date of Patent: Jan. 28, 2020

(54) METHOD FOR RAPID MATURATION OF DISTILLED SPIRITS USING LIGHT AND ULTRASONIC ENERGY PROCESSES

(71) Applicant: Lost Spirits Distillery, LLC, Salinas, CA (US)

(72) Inventor: Bryan Alexander Davis, Salinas, CA (US)

(73) Assignee: Lost Spirits Technology, LLC, Los Angeles, CA (US)

( * ) Notice: Subject to any disclaimer, the term of this patent is extended or adjusted under 35 U.S.C. 154(b) by 383 days.

(21) Appl. No.: 15/239,603

(22) Filed: Aug. 17, 2016

(65) Prior Publication Data

US 2016/0355771 A1 Dec. 8, 2016

Related U.S. Application Data

(63) Continuation-in-part of application No. 14/594,944, filed on Jan. 12, 2015, now Pat. No. 9,637,712, which is a continuation-in-part of application No. 14/152,915, filed on Jan. 10, 2014, now abandoned.

(60) Provisional application No. 62/206,075, filed on Aug. 17, 2015.

(51) Int. Cl.
| | |
|---|---|
| *C12H 1/06* | (2006.01) |
| *C12H 1/16* | (2006.01) |
| *C12H 1/18* | (2006.01) |
| *C12G 3/07* | (2006.01) |

(52) U.S. Cl.
CPC ............... *C12H 1/165* (2013.01); *C12G 3/07* (2019.02); *C12H 1/18* (2013.01)

(58) Field of Classification Search
CPC .. C12H 1/165; C12H 1/16; C12H 1/18; A23L 3/005; C12G 3/005; C12G 3/08; C12G 3/07; C12G 3/12; C12G 3/065; C12G 3/06
See application file for complete search history.

(56) References Cited

U.S. PATENT DOCUMENTS

| | | | | |
|---|---|---|---|---|
| 7,063,867 B2 * | 6/2006 | Tyler, III | .................. | C12H 1/16 426/237 |
| 2011/0070331 A1 * | 3/2011 | Watson | ..................... | C12H 1/14 426/15 |
| 2013/0228080 A1 * | 9/2013 | Fiset | ......................... | A23L 3/28 99/451 |

* cited by examiner

*Primary Examiner* — Hong T Yoo
(74) *Attorney, Agent, or Firm* — Polsinelli PC

(57) ABSTRACT

An improved system and process for rapidly producing distilled spirits having characteristics associated with a much longer maturation process is provided. The method involves (a) subjecting an unmatured spirit to ultrasonic energy at a power of at least 3 Watts/Liter for at least one hour while maintaining the temperature of the unmatured spirit between 90° F. and 150° F.; and (b) subjecting the unmatured spirit and wood to actinic light at a wavelength ranging from 400 nm to 1000 nm for a cumulative exposure of at least 2,280,000 lux hours. The disclosure also provides embodiments where a spirit processed with ultrasonic energy is mixed with a spirit that has been separately treated with light to give characteristics of a mature spirit.

12 Claims, No Drawings

METHOD FOR RAPID MATURATION OF DISTILLED SPIRITS USING LIGHT AND ULTRASONIC ENERGY PROCESSES

CROSS REFERENCE TO RELATED APPLICATIONS

This application is a continuation-in-part of U.S. Ser. No. 14/594,944 filed Jan. 12, 2015, which is a continuation-in-part of U.S. Ser. No. 14/152,915, filed Jan. 10, 2014 and claims priority to U.S. Provisional Application No. 62/206,075 filed Aug. 17, 2015. The disclosures of each application listed above are incorporated by reference.

TECHNICAL FIELD

The technical fields are: Food Chemistry and Other Consumer Goods.

BACKGROUND ART

By some accounts, human beings have been aging distilled spirits in wooden containers for almost five hundred years. Despite billions of person-hours of experience, the myriad of chemical reactions responsible for the flavor of wood-aged spirits are not fully understood. Spirits derive their distinct characteristics over time while stored in wooden containers in part by the production and presence of esters. Esters are compounds made by chemically bonding acid molecules and alcohol molecules to form new compounds, often with pleasant aromas and tastes. This process is known as "esterification." In addition to esterification, wood-aged spirits derive additional characteristics through other processes, including extraction of flavor compounds from the wood container (e.g., the ubiquitous oak barrel). These processes are not necessarily separate or distinct, and can interact with and affect each other.

Traditionally, producing wood-aged distilled spirits has included carboxylic acid esterification, phenolic acid esterification, and the formation of complex esters, including both phenolic and carboxylic acids. Carboxylic acid esters are responsible for the fruity aromas and tastes in distilled spirits. Carboxylic precursor acids are derived from the yeast and bacteria during fermentation. If organic materials are used for the container in which these reactions occur, those materials also influence the process. For example, where a charred or toasted oak barrel is used, carboxylic precursor acids are also derived from thermal decomposition of the oak polymer, hemi-cellulose, found in the inner lining of the barrel. Carboxylic precursor acids are largely responsible for "off-flavors" in distilled spirits. Additionally, a common flaw with a solvent-like "off flavor" is produced by build-up of ethyl acetate in the maturing spirit. Off-flavors are various flavorful or aromatic compounds present in spirits that are often described by connoisseurs using colorful terms (e.g., "sulfury", "solventy", "meaty", "acidic", "metallic", "vegetal", etc.). Phenolic aldehydes also play a major role producing aromas similar to vanilla, pipe tobacco, and smoke. Phenolic aldehydes are largely derived from thermally broken down oak polymers found within the inner lining of the barrel. Complex esters are responsible for complex honeyed aromas in distilled spirits. The complex esters are generally produced from the chemical reactions of both carboxylic and phenolic acids/aldehydes with alcohols during the time in the barrel or other container.

Fischer esterification of fatty acids and alcohol is a well-understood and commonly practiced chemical reaction. A typical laboratory process involves heating a solution of fatty acids and alcohols under reflux in the presence of an acid catalyst. In laboratory settings, strong acids (e.g., sulfuric acid) are typically employed as the catalyst, but this can be incompatible with spirit making where other functional groups are sensitive to stronger acids and where chemical additives are typically prohibited. It has long been known that Fischer esterification can also be completed using weak acid catalysts, but at the expense of relatively slow reaction rates. Where charred or toasted oak barrels are used during the maturation of distilled spirits, weak acids may be gradually extracted from organic material in the walls of the barrel. It typically takes years for esters to accumulate using weak acid catalysts derived from the barrel, although it has been observed that in warmer environments (i.e., modestly heated within the range of normal atmospheric conditions less than 120° F.) the process can be accelerated significantly (from decades to years). This early form of accelerated aging comes at the cost of increased evaporation from the barrel. Often as much as 50% of the product can be lost to evaporation.

Wood extraction is the process that gives distilled spirits their color and astringent "oaky" and "smoky" taste. Traditionally, this is attributed to tannins (polyphenols). Interestingly our analysis of mature spirits did not find significant evidence of tannins. But instead found myriad less complex wood derived phenols such as sinapaldehyde and syringaldehyde. These oak-extracted compounds proved unexpectedly useful as markers for monitoring the aging process described below.

Attempts have been made to accelerate maturation of distilled spirits by cycling or varying pressures over relatively large ranges (e.g., between −2 and 10 ATM; see U.S. Patent Publication No. 2013/0149423). These processes generally do not yield a product close enough to that produced by traditional means. Other environmental conditions are more important to achieve characteristics associated with a mature flavor.

Esterification and the extraction of wood compounds from the wood container are some of the primary reactions taking place in the maturation process of distilled spirits. Because these processes run concurrently, and often interact with or depend on each other as well as the material and other conditions of their environment over time, it is very difficult to deviate very far from traditional methods while still achieving similar results. For example, rapid oak extraction may not provide enough time for interaction with a wood container to pick up some of the more subtle and complex flavors present in traditionally aged spirits. Much of the expense in spirit making stems from the long latency in creating the end product as well as the product evaporation from the barrel. Stock must be stored, often in climate-controlled environments, and tested repeatedly during maturation. But, it is difficult to predict markets many years out. Makers that produce too much product fail to maximize their investment, whereas those that produce too little fail to capture potentially significant portions of the upside.

Consumers of distilled spirits are often educated and discerning. Many will refuse to consume or pay a premium for non-authentic tasting products. What is needed is a means by which the quality and complexities associated with traditionally aged spirits can be achieved in a significantly reduced timeframe, preferably with a reduction in the evaporation of finished goods and a reduction of the build-up of ethyl acetate.

Processes such as U.S. Pat. No. 7,063,867 suggest maturing a spirit using ultrasonic energy and disclose a process for subjecting a distilled consumable alcohol to ultrasonic energy to accelerate the chemical reactions involved in maturation of the consumable alcohol. U.S. Pat. No. 7,063,867 teaches that the consumable alcohol is subjected to ultrasonic energy of at least 3 Watts/liter for at least one hour while maintaining a temperature of between 90° F. and 150° F. U.S. Pat. No. 7,063,867 does not teach or suggest combining the process with an actinic light process.

SUMMARY

Provided herein is a process for producing a distilled spirit having characteristics associated with a mature spirit comprising: (a) subjecting an unmatured spirit to ultrasonic energy at a power of at least 3 Watts/Liter for at least one hour while maintaining the temperature of the unmatured spirit between 90° F. and 150° F.; and (b) subjecting the unmatured spirit and wood to actinic light at a wavelength ranging from 400 nm to 1000 nm for a cumulative exposure of at least 2,280,000 lux hours, wherein the steps are separate and not overlapping.

In one embodiment, the process comprises: (a) subjecting an unmatured spirit to ultrasonic energy at a power of at least 3 Watts/Liter for at least one hour while maintaining the temperature of the unmatured spirit between 90° F. and 150° F. to give a first distilled spirit mixture; (b) subjecting the unmatured spirit and wood to actinic light at a wavelength ranging from 400 nm to 1000 nm for a cumulative exposure of at least 2,280,000 lux hours to give a second distilled spirit mixture; and (c) mixing the first and second distilled spirit mixtures to produce the mature spirit, wherein the steps are separate and not overlapping.

Other features and aspects of the disclosure will be provided in more detail herein.

DETAILED DESCRIPTION

The invention pertains to processes for producing a distilled spirit having characteristics associated with a mature distilled spirit. The distilled spirit produced in accordance with the process has many of the characteristics associated with a matured distilled spirit produced in accordance with industry standards, but is advantageously produced in a shortened timeframe while eliminating evaporation and greatly reducing the "off flavors" associated with excess ethyl acetate. By subjecting an unmatured distilled spirit to ultrasonic energy and contacting the spirit and wood to actinic light, the maturation process can be shortened without reducing the quality of the spirit. In particular, it has surprisingly been found that the processes described herein produce a spirit having similar chemical markers as a 32 year-old spirit in a significantly reduced period of time.

As used herein, a spirit refers to any distilled spirit. In particular embodiments, the spirit is a sugar cane-based, grain-based, fruit-based, or agave-based spirit such as rum, tequila, mescal, whiskey, brandy, gin, or combinations thereof.

A distilled spirit having the characteristics associated with a matured distilled spirit, as used herein, describes a spirit, which, by one or more chemical markers, has attained characteristics associated with spirits aged in accordance with industry standards. Such standards, for example, include aging a spirit in wood over a period of time greater than 1, 5, 10, 15, 20, 25, or 30 years. The characteristics associated with a matured distilled spirit may include taste, aroma, and body profiles, such as smoothness.

Historically, ethyl acetate concentration was used as a marker for the progress of aging where higher amounts indicate greater maturation time. But, ethyl acetate is not itself desirable and adds a flavor and aroma comparable to paint thinners. Moreover, samples of distilled spirits receiving high reviews, comparable or in some cases better than an aged spirit, do not always have a high ethyl acetate concentration. Using modern techniques, highly prized spirits can be analyzed for their chemical make-up. Using this data, chemical markers can be selected as a model for a mature spirit. Surprisingly, these chemical markers provide advantages over the traditional measurement of ethyl acetate concentration to determine age. In particular, the chemical markers set forth herein are desirable for modeling purposes because, unlike ethyl acetate, the chemical markers contribute to the desired flavor profile.

The inventor has surprisingly discovered that a set of chemical markers may be correlated with the flavor characteristics of a mature spirit regardless of ethyl acetate concentration. Furthermore, methods to reduce the ethyl acetate concentration during maturation have been discovered. Because the flavor of ethyl acetate is not desirable, this discovery improves the flavor profile of the spirits made by this method. In one embodiment, ethyl acetate concentrations are reduced to a concentration less than about 200,000 µg/L. In another embodiment, the ethyl acetate concentrations range between about 50,000 µg/L to about 170,000 µg/L.

A distilled spirit having the characteristics associated with a matured distilled spirit, as used herein, describes a spirit, which has attained a flavor and aroma profile organoleptically similar to spirits aged with wood for many years, and typically shows a chemical profile containing key chemical markers in particular proportions.

In one embodiment, a mature spirit can be characterized by the increasing concentrations of one or more chemical markers. Three markers in particular, are thought to be particularly useful for defining a mature spirit: sinapaldehyde, ethyl decanoate, and ethyl dodecanoate. Ethyl decanoate and ethyl dodecanoate are often found in unmature spirits at low concentrations. Sinapaldehyde is typically not found in an unmature spirit.

In one embodiment, a mature spirit is characterized by an increase of at least about 3× for ethyl dodecanoate over an unmature spirit. In another embodiment, a mature spirit is characterized by an increase of at least about 3× for ethyl decanoate over an unmature spirit. Increased concentrations may be assessed by any method known in the art.

A spirit that presents these three compounds in relative proportion (as assessed by peak height measured by GCMS) typically has desirable flavor characteristics. In this regard, a mature spirit may also be characterized by a sinapaldehyde peak greater than 80% and less than 200% of the peak height of ethyl decanoate and ethyl dodecanoate as measured by GCMS. Without being bound to any theory, it is believed that sinapaldehyde concentration is disproportionately important in creating a spirit that meets the organoleptic properties of a mature spirit.

The unmatured distilled spirit is a spirit that has not attained the markers or characteristics associated with a matured distilled spirit. The "unmatured distilled spirit," as described herein, refers to white or raw spirits, as well as partially matured spirits, provided that the unmatured distilled spirit is lacking in certain characteristics of a matured spirit. The unmatured distilled spirit, as described herein, has an alcohol content of at least 50% by volume. In some embodiments, the alcohol content of the unmature distilled spirit is between 50% and 80% by volume.

The term "distilled spirit mixture," as used herein, refers to any distillate on the spectrum from matured to unmatured. The term "distillate" as used herein refers to the liquid composition in the vessel and may include an unmatured distilled spirit, a matured distilled spirit, or a distilled spirit mixture.

The unmatured distilled spirit is contacted with wood in a vessel. In one embodiment, the wood is provided as the vessel for holding the distillate. In such embodiments, the vessel is, for example, an oak barrel. In other embodiments, wood may be provided to the inside of the reaction vessel, which is optionally made of wood. For example, wood chips may be added such that they are submerged or floating on top of the distillate. Wood may also be provided as various structural configurations within the vessel including as baffles or packing. In still other embodiments, wood may include wood extracts and raw acids designed to mimic the characteristics of wood. In a preferred embodiment, the wood is oak.

Of the various advantages of the present invention, one is that no additional ingredients or acids are provided to facilitate the process. In this regard, the process is free of additives. Without being bound to any particular theory, it is thought that the inventive process rapidly extracts acids from the wood. These acids facilitate the esterification process without the need for additives beyond the wood and the unmatured distilled spirit.

A. Sequential Ultrasonic and Light Processing

One aspect of the present invention provides a process for producing a mature spirit using sequential ultrasonic and light processing.

In this regard, the process comprises the steps of (a) subjecting an unmatured spirit to ultrasonic energy at a power of at least 3 Watts/Liter for at least one hour while maintaining the temperature of the unmatured spirit 1 between 90° F. and 150° F.; and (b) subjecting the unmatured spirit and wood to actinic light at a wavelength ranging from 400 nm to 1000 nm for a cumulative exposure of at least 2,280,000 lux hours. Steps (a) and (b) are non-overlapping, separate and sequential. For example, when step (a) occurs before step (b) heating and ultrasonic energy are discontinued before actinic light is applied.

(i) Ultrasonic Energy

As noted previously, one step of the process is subjecting an unmatured spirit to ultrasonic energy at a power of at least 3 Watts/Liter for at least one hour while maintaining the temperature of the unmatured spirit between 90° F. and 150° F.

The amount of ultrasonic energy can and will vary in different embodiments. The amount of ultrasonic energy to which the unmature spirit is subjected to should be at least 1 Watt per liter. In other embodiments, the amount of ultrasonic energy is between 1 Watt per liter and 100 Watts per liter. More preferably, the amount of ultrasonic energy is at least, 2, 3, 4, 5, 10, 15, or 20 Watts per liter. In a preferred embodiment, the amount of ultrasonic energy is greater than about 3 Watts per liter.

At the above energy levels, the unmature spirit can be sonicated at various ultrasonic frequencies without limitation. For instance, the unmatured spirit can be sonicated at a frequency of from about 20,000 Hz to about 170,000 Hz. In one embodiment, the unmatured spirit can be sonicated at a frequency of about 20,000 Hz, about 30,000 Hz, about 40,000 Hz, about 50,000 Hz, about 60,000 Hz, about 70,000 Hz, about 80,000 Hz, about 90,000 Hz, about 100,000 Hz, about 110,000 Hz, about 120,000 Hz, about 130,000 Hz, about 140,000 Hz, about 150,000 Hz, about 160,000 Hz, or about 170,000 Hz.

The temperature of the unmatured spirit is maintained between about 90° F. and 150° F., or more preferably about 90° F. and about 120° F. during the process where the unmatured spirit is subjected to ultrasonic energy. If necessary, a cooling and/or heating device can be placed in association with the vessel during the process in order to control the temperature of the unmatured spirit. In one embodiment, while being subjected to ultrasonic energy, the unmature spirit can also be circulated. Circulating the liquid can distribute the thermal and ultrasonic energy more evenly and can produce a more uniform product.

The time period over which the unmatured spirit is subjected to ultrasonic energy is generally at least about one hour. In some embodiments, the unmatured spirit is subjected to ultrasonic energy for at least about 1 hour, at least about 2 hours, at least about 3 hours, at least about 4 hours, at least about 5 hours, at least about 10 hours, at least about 15 hours, at least about 20 hours, or at least about 25 hours. Preferably, the time period ranges between about 1 hour and about 10 hours.

The ultrasonic energy is applied to the unmatured spirit that is held in a sealed vessel or such that evaporation of volatile compounds is prevented. The pressure inside the vessel can and will vary in different embodiments of the invention.

Generally, ultrasonic energy is applied continuously through the given time period. But, it may also be provided for the given time period in a manner that is not continuous, for example, at intervals totaling the stated time period.

Optionally the vessel for the ultrasonic energy step is made of wood or contains wood.

(ii) Actinic Light Process

The unmature distilled spirit is also subjected to actinic light. In accordance with one embodiment of the invention, the unmature distilled spirit is subjected to actinic light in the range of 400 nm to 1000 nm for a cumulative exposure of at least 2,280,000 lux hours.

The actinic light process takes place in a container that allows light in the UV-Visible spectrum to pass through. The container is filled with the spirit to be processed and is also generally filled with wood. In one embodiment, glass carboys are used. The actinic light may come from a variety of sources including natural, synthetic, or a combination thereof. Generally, the exposure in this step will be at least 2,280,000 lux hours, but sometimes as high as 20,000,000 lux hours. In other embodiments, the total exposure is at least 1,000,000 lux hours, at least 1,500,000 lux hours, at least 2,000,000 lux hours, at least 2,500,000 lux hours, or at least 3,000,000 lux hours. Where very high concentrations of the chemical markers described herein are sought even greater exposures might be appropriate.

The time period over which the actinic light process is conducted can and will vary over different embodiments. Where natural light is used, the total exposure to actinic light may range from about 100 hours to about 500 hours, from about 250 hours to about 750 hours, from about 500 hours to about 1000 hours, from about 750 hours to about 1250 hours, or from about 1000 hours to about 1500 hours. Where synthetic lights are used, the total exposure to actinic light may range from about 12 hours to about 24 hours, from about 24 hours to about 48 hours, from about 48 hours to about 96 hours. If artificial lights are used that provide a very low lux value, time is increased proportionally to achieve the lux hour value.

Preferably, the actinic light process is conducted below the boiling point of the spirit. In some embodiments, this requires that the amount or duration of actinic light is controlled, for example, by exposing the spirit to light in a discontinuous manner, by cooling the spirits, by temporarily shielding the spirit from the actinic light, or by other methods for controlling temperature that are known in the art. This process may also be carried out under reflux to prevent the evaporation of volatile compounds.

Although pressure is not thought to be critical to the actinic light processing, the actinic light processing is generally conducted at atmospheric pressures. The light processing step may accommodate higher or lower pressures.

In one preferred embodiment, a tungsten halogen bulb is used to provide the actinic light. The bulb has an average light temperature of 2900° F. The sprits are placed in clear containers where about 100 liters of spirit cover a square meter. The area is illuminated to about 190,000 lux with the light being toggled off and on in periods of 2-4 hours to reach a total exposure of 4,500,000 lux hours. Lux hours, as used herein, describes the light exposure in a given hour because it describes the total luminescence in a given time. Radiant flux measurements were unavailable because the data was not available.

In another embodiment, a distilled spirit is placed in a translucent jar that was kept in a greenhouse for 168 hours to achieve a total of approximately 4,200,000 lux hours.

In another embodiment, twenty 500 W halogen bulbs are used to provide light to seventy jars. The lights are toggled on and off for three days to provide the total lux hours needed for the reaction.

In still another embodiment, 500 W halogen bulbs are shined on both sides of a glass jar. The lights are toggled on and off for 14 hours to provide the total lux hours needed for the reaction.

When the actinic light processing is complete, the resulting actinic light-treated spirit mixture is removed from the light source.

(iii) Optional Further Processing

Optionally, the spirit produced by the process described in Sections A(i) through A(ii) may be followed by one or more additional actinic light or ultrasonic energy steps.

B. Mixed Batch Process

In another embodiment, the present disclosure provides a mixed batch process for producing a mature spirit. In this embodiment, the process comprises (a) subjecting a first unmatured distilled spirit to ultrasonic energy at a power of at least 3 Watts/Liter for at least one hour while maintaining the temperature of the unmature spirit between 90° F. and 150° F.; (b) contacting a second unmatured distilled spirit and wood to actinic light at a wavelength ranging from 400 nm to 1000 nm for a cumulative exposure of at least 2,280,000 lux hours to give a second distilled spirit mixture; and (c) mixing the first and second distilled spirit mixtures to produce the mature spirit.

Step (a) of the process is conducted as described in Section (A)(i). Separately, a second unmatured distilled spirit is treated with actinic light as described in Section (A)(ii). The second unmatured distilled spirit is not contacted with ultrasonic energy. Instead, the first distilled spirit mixture and the second distilled spirit mixture are mixed together.

The first distilled spirit mixture and the second distilled spirit mixture may be mixed in any ratio without limitation. In one embodiment, the ratio ranges between about 70:30 and about 30:70 of the first distilled spirit mixture to the second distilled spirit mixture. In particular embodiments, the ratio of the first distilled spirit mixture and the second distilled spirit mixture is about 70:30, about 65:35, about 60:40, about 55:45, about 50:50, about 45:55, about 40:60, about 35:65, or about 30:70. High concentration products may range from 99:1 to 1:99, or, more preferably from a ratio of 95:5 to 5:95 of the first distilled spirit mixture to the second distilled spirit mixture.

The mixture of the first distilled spirit mixture and the second distilled spirit mixture is generally allowed to react for at least 1 hour. Without being bound to any theory, it is believed that chemical reactions occur during this time period that enhance the flavor profile over the flavor profile of the separately produced first distilled spirit mixture and the second distilled spirit mixture.

C. Simultaneous Ultrasonic and Light Processing

In still another embodiment, the present disclosure provides simultaneous process for producing a mature spirit. In this embodiment, the process comprises contacting a unmatured distilled spirit with ultrasonic energy at a power of at least 3 Watts/Liter for at least one hour while maintaining the temperature of the unmatured spirit between 90° F. and 150° F., and at the same time, contacting the unmatured distilled spirit with actinic light at a range of 400 nm to 1000 nm for a cumulative exposure of at least 2,280,000 lux hours to give a mature spirit. Ultrasonic processing is conducted as described in Section (A)(i). Actinic light exposure is as described in Section (A)(ii).

D. Wood Washing

In still another embodiment, the wood described in sections A-C above is washed prior to use in the method. Wood washing has the effect of increasing the concentrations of certain chemical markers that are important to the flavor of the matured spirit. In particular, wood washing prior to conducting the method can lead to a higher ethyl acetate concentration in the matured spirit.

Wood washing may be conducted by contacting the compound described below with wood. This contacting includes submerging the wood for a period of time in a solution containing the compound or by pouring a solution containing the compound over the wood.

In one embodiment, the wood is washed with a carboxylic acid containing 1 to 10 carbon atoms. The carboxylic acid may be selected from, for example, acetic acid, propionic acid, butanoic acid, pentanoic acid, hexanoic acid, heptanoic acid, octanoic acid, nonanoic acid, decanoic acid, branched carboxylic acids such as isobutyric acid, and aromatic acids such as benzoic acid and 2-phenylacetic acid.

The carboxylic acid may be diluted in water for the washing process. For example, the carboxylic acid can be a dilute solution having a concentration from about 0.0001% -1% by volume, or 1% to about 10% by volume of the carboxylic acid, or the solution may be concentrated to about 20% by volume, about 30% by volume, about 40% by volume, about 50% by volume, about 60% by volume, about 70% by volume, about 80% by volume, about 90% by volume, or higher.

In one embodiment, the wood is washed with vinegar (i.e., a dilute solution of acetic acid in water). When wood washing is conducted with any one of the processes described in sections A-D, the final matured spirit has higher ethyl acetate concentrations. For example, the ethyl acetate concentration may be increased by 1.5× or more compared to spirit matured using this process without the vinegar washing. These higher concentrations can give flavors characteristic to whiskeys such as bourbon and rye whiskeys where higher ethyl acetate concentrations are common.

What is claimed is:

1. A process for producing a distilled spirit having characteristics associated with a mature spirit comprising:
   (a) subjecting an unmatured spirit to ultrasonic energy at a power of at least 3 Watts per liter for at least one hour while maintaining a temperature of the unmatured spirit between 90° F. and 150° F.; and
   (b) subjecting the unmatured spirit and wood to actinic light at a wavelength spectrum ranging from 400 nm to 1000 nm from about 12 hours to about 96 hours,
   wherein the steps are separate and not overlapping and wherein the combination of step (a) and step (b) produce the distilled spirit having characteristics associated with the mature spirit.

2. The process of claim 1, wherein the unmatured spirit is selected from the group consisting of sugar cane spirits, grain spirits, fruit spirits, agave spirits, and combinations thereof.

3. The process of claim 1, wherein the unmatured spirit is selected from the group consisting of rum, tequila, mescal, whiskey, brandy, gin, and combinations thereof.

4. The process of claim 1, wherein the unmatured spirit is rum.

5. The process of claim 1, wherein the mature spirit is characterized by an increase in sinapaldehyde.

6. The process of claim 1, wherein the mature spirit is characterized by an increase in sinapaldehyde, ethyl dodecanoate, and ethyl decanoate.

7. The process of claim 1, wherein the mature spirit has an ethyl acetate concentration of about 59,000 µg/L.

8. The process of claim 1, wherein the process further comprises at least one additional ultrasonic energy step where the unmatured spirit is subjected to ultrasonic energy at a power of at least 3 Watts/Liter for at least one hour while maintaining the temperature of the unmatured spirit between 90° F. and 150° F.

9. The process of claim 1, wherein the process further comprises at least one additional step where the unmatured spirit is subjected to actinic light at a wavelength spectrum ranging from 400 nm to 1000 nm from about 12 hours to about 96 hours.

10. The process of claim 1, wherein step (a) is conducted prior to step (b).

11. The process of claim 1, wherein step (b) is conducted prior to step (a).

12. The process of claim 1, wherein the wood is washed with a solution containing a carboxylic acid prior to the process.

* * * * *